United States Patent
Phillips et al.

(10) Patent No.: US 10,726,156 B1
(45) Date of Patent: *Jul. 28, 2020

(54) METHOD AND SYSTEM FOR PROTECTING USER INFORMATION IN AN OVERLAY MANAGEMENT SYSTEM

(71) Applicant: Capital One Services, LLC, McLean, VA (US)

(72) Inventors: Jeremy Phillips, Brooklyn, NY (US); Zachary Podbela, Muttontown, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,823

(22) Filed: Dec. 12, 2019

Related U.S. Application Data

(63) Continuation of application No. 16/521,807, filed on Jul. 25, 2019, now Pat. No. 10,552,637.

(51) Int. Cl.
| | |
|---|---|
| *G06F 21/62* | (2013.01) |
| *G06F 16/9035* | (2019.01) |
| *G06Q 40/06* | (2012.01) |
| *G06F 16/903* | (2019.01) |
| *G06F 21/60* | (2013.01) |

(52) U.S. Cl.
CPC ...... *G06F 21/6254* (2013.01); *G06F 16/9035* (2019.01); *G06F 16/90335* (2019.01); *G06F 21/602* (2013.01); *G06Q 40/06* (2013.01)

(58) Field of Classification Search
CPC .............. G06F 21/6254; G06F 21/602; G06F 16/90335; G06F 16/9035; G06Q 40/06
See application file for complete search history.

(56) References Cited

U.S. PATENT DOCUMENTS

| | | | |
|---|---|---|---|
| 7,844,519 B2 | 11/2010 | Wehunt et al. | |
| 8,055,664 B2 | 11/2011 | Baluja et al. | |
| 8,392,305 B2 | 3/2013 | Wehunt et al. | |
| 8,452,706 B1 | 5/2013 | Moadus et al. | |
| 8,793,174 B1 | 7/2014 | Wehunt et al. | |
| 9,400,980 B2 | 7/2016 | Pitroda et al. | |
| 9,842,322 B2 | 12/2017 | Johnston et al. | |
| 9,842,367 B2 | 12/2017 | Johnston et al. | |
| 2003/0225688 A1 | 12/2003 | Dobbins | |
| 2005/0021456 A1 | 1/2005 | Steele et al. | |
| 2007/0078719 A1 | 4/2007 | Schmitt et al. | |
| 2014/0019337 A1 | 1/2014 | Esch et al. | |
| 2016/0284004 A1* | 9/2016 | Taylor | G06Q 30/0631 |

OTHER PUBLICATIONS

Jun. 9, 2019. Chen, J. Overlay definition. Investopedia. Available at https://www.investopedia.com/terms/o/overlay.asp.

* cited by examiner

*Primary Examiner* — Hee K Song
(74) *Attorney, Agent, or Firm* — Banner & Witcoff, Ltd.

(57) ABSTRACT

Methods and systems described herein provide for protecting user information in an overlay service. Protecting user information may include redacting personally identifiable information (PII) from information that may be exposed to third parties. Additionally, protecting user information may include opening a second account on behalf of the user using a plurality of unique identifiers in lieu of information identifying the user. This protects users' identities and privacy as their assets are transferred between various institutions.

20 Claims, 12 Drawing Sheets

METHOD AND SYSTEM FOR PROTECTING USER INFORMATION IN AN OVERLAY MANAGEMENT SYSTEM

CROSS REFERENCE TO RELATED APPLICATIONS

This application is a continuation of co-pending application U.S. application Ser. No. 16/521,807, filed on Jul. 25, 2019 and entitled "Method And System For Protecting User Information In An Overlay Management System," the entirety of which is hereby incorporated in its entirety by reference.

FIELD OF USE

Aspects of the disclosure relate generally to data privacy and more specifically to protecting user information in an overlay management system.

BACKGROUND

Overlay management refers to a portfolio management style that analyzes and balances an investor's separately managed accounts. Overlay management software tracks the investor's positions, makes adjustments to ensure that the portfolio remains in balance, and prevents any inefficient transactions from accruing. Additionally, overlay management software may implement part, or all, of the investor's strategies. As part of the strategy implementation, the overlay management software may open accounts (i.e., savings accounts, certificates of deposit, investment accounts, etc.) to increase returns on investment, for example, by taking advantage of a higher introductory interest-rate, a sign-up bonus, or some other incentive. However, in opening these accounts, the overlay management software exposes the investor's personally identifiable information (PII) to abuse and malicious actors.

Aspects described herein may address these and other problems, and generally improve the security, data protection, and privacy of overlay management software by protecting user information and PII.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may include protecting a user's information in an overlay service. An anonymized token may be used to identify a user's preferences to third parties, which locate a plurality of second accounts for the user to select from. The user may select, via an interface, a second account from the plurality of second accounts. In response to selecting the second account, additional safeguards may be employed while opening the second account to prevent the disclosure of the user's personally identifiable information (PII). These safeguards may include a variety of obfuscation and substitution techniques designed to protect the user-inventor's PII. Accordingly, the security, data protection, and privacy of overlay management software is improved by protecting a user's PII using safeguards described herein.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for implementing safeguards in overlay management software that protects user information and personally identifiable information (PII). As discussed above, typical overlay management software exposes user information and PII to third parties when the overlay management software opens accounts as part of an investment strategy. This disclosure of user information and PII creates security and privacy risks. For instance, the user information and PII may be intercepted by a malicious actor in-transit between the overlay management software and the third-party. Additionally, user information and PII may be obtained by the malicious actor if the third-party were to be compromised.

Systems as described herein may include protecting a user's information in an overlay service. In this regard, an anonymized token may be used to identify a user's preferences for a second account. Once the second account is identified, precautions may be taken while opening the second account. In some embodiments, the second account may be opened without disclosing personally identifiable information (PII) of the user. Instead of PII, the overlay service may employ a number of obfuscation techniques that may be used to open the second account anonymously. Accordingly, the disclosure of PII may be limited to a single institution, thereby reducing the likelihood that the user's PII falls into the hands of a malicious user.

Figure 1:
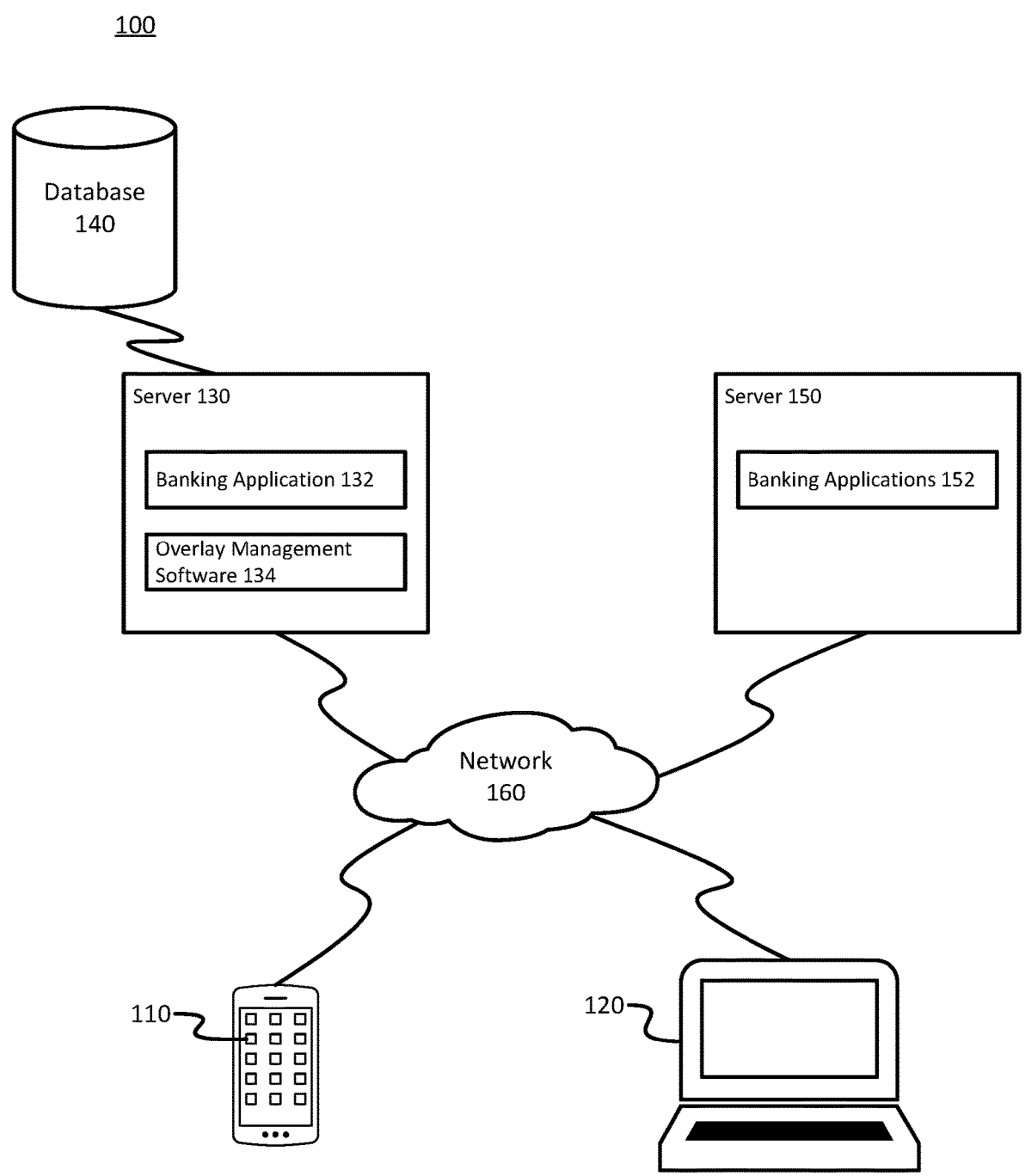
FIG. 1 shows an example of a system in which an overlay management server may be implemented according to one or more aspects of the disclosure.

Turning to FIG. 1, a system 100 is shown that includes a first user device 110, a second user device 120, a first server 130 connected to a first database 140, and a second server 150 interconnected via network 160.

First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, and withdrawing money from an automated teller machine (ATM).

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. These websites may include banking websites that allow the user to access his/her banking information and perform routine banking functions. In some embodiments, second user device 120 may include a banking application that allows the user to access his/her banking information and perform routine banking functions.

First server 130 may be any server capable of executing banking application 132 and overlay management software 134. Additionally, first server 130 may be communicatively coupled to first database 140. In this regard, first server 130 may be a stand-alone server, a corporate server, or a server located in a server farm or cloud-computer environment. According to some examples, first server 130 may be a virtual server hosted on hardware capable of supporting a plurality of virtual servers.

Banking application 132 may be server-based software configured to provide users with access to their account information and perform routing banking functions. In some embodiments, banking application 132 may be the server-based software that corresponds to the client-based software executing on first user device 110 and second user device 120. Additionally, or alternatively, banking application 132 may provide users access to their account information through a website accessed by first user device 110 or second user device 120 via network 160.

Overlay management software 134 may be server-based software configured to analyze a user's investment positions and makes adjustments to maximize the user's return on investment and ensure the users' investment positions remain balanced. In this regard, overlay management software 134 may provide an interface to the user that provides the user with a series of questions to better understand the user's risk tolerance and investment goals. In some embodiments, the interface may be provided to the user through one or more banking interfaces provided by banking application 132. Additionally, or alternatively, overlay management software 134 may analyze the user's account information, account history, investment preferences, or other information managed by banking application 132 to understand the user's risk tolerance and investment goals. Additionally, or alternatively, overlay management software 134 may discover one or more accounts or services offered by other banks that align with the user's investment goals and risk tolerance. In this regard, overlay management software 134 may include a scraping algorithm that analyzes offers and services provided by other banks to determine the features provided by the offers and services. As will be discussed in greater detail below, overlay management software 134 may open one or more accounts on behalf of the user to maximize his/her return on investment.

First database 140 may be configured to store banking information on behalf of banking application 132. Banking information may include, but is not limited to, personal information, account information, and user-preferences. Personal information may include a user's name, address, phone number (i.e, mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof.

Second server 150 may be similar to first server 130. In this regard, second server 150 may be a server capable of executing banking application 152. Second server 150 may include overlay management software (not shown) and a second database (not shown). Like first server 130, second server 140 may be a stand-alone server, a corporate server, a server located in a server farm or cloud-computer environment, or a virtual server hosted on hardware capable of supporting a plurality of virtual servers.

First network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
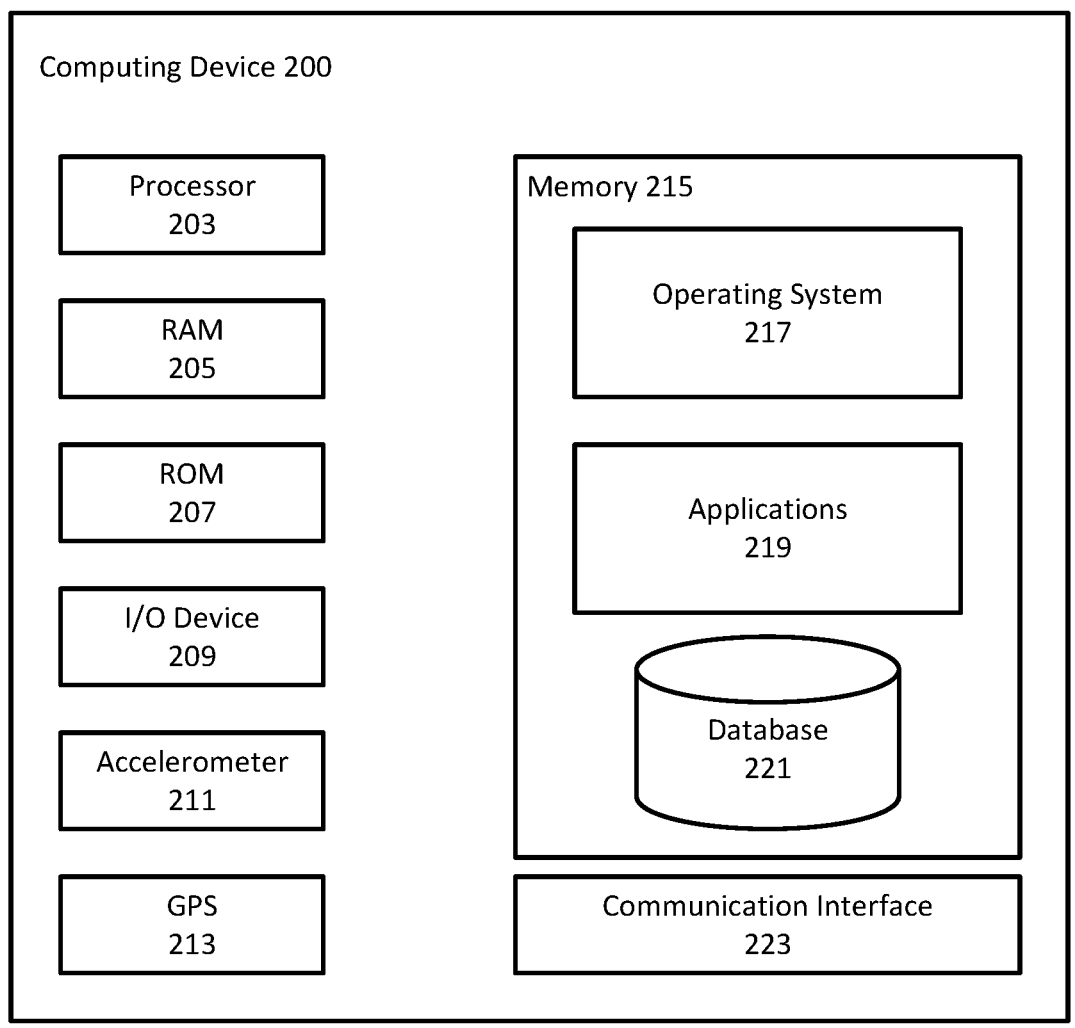
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
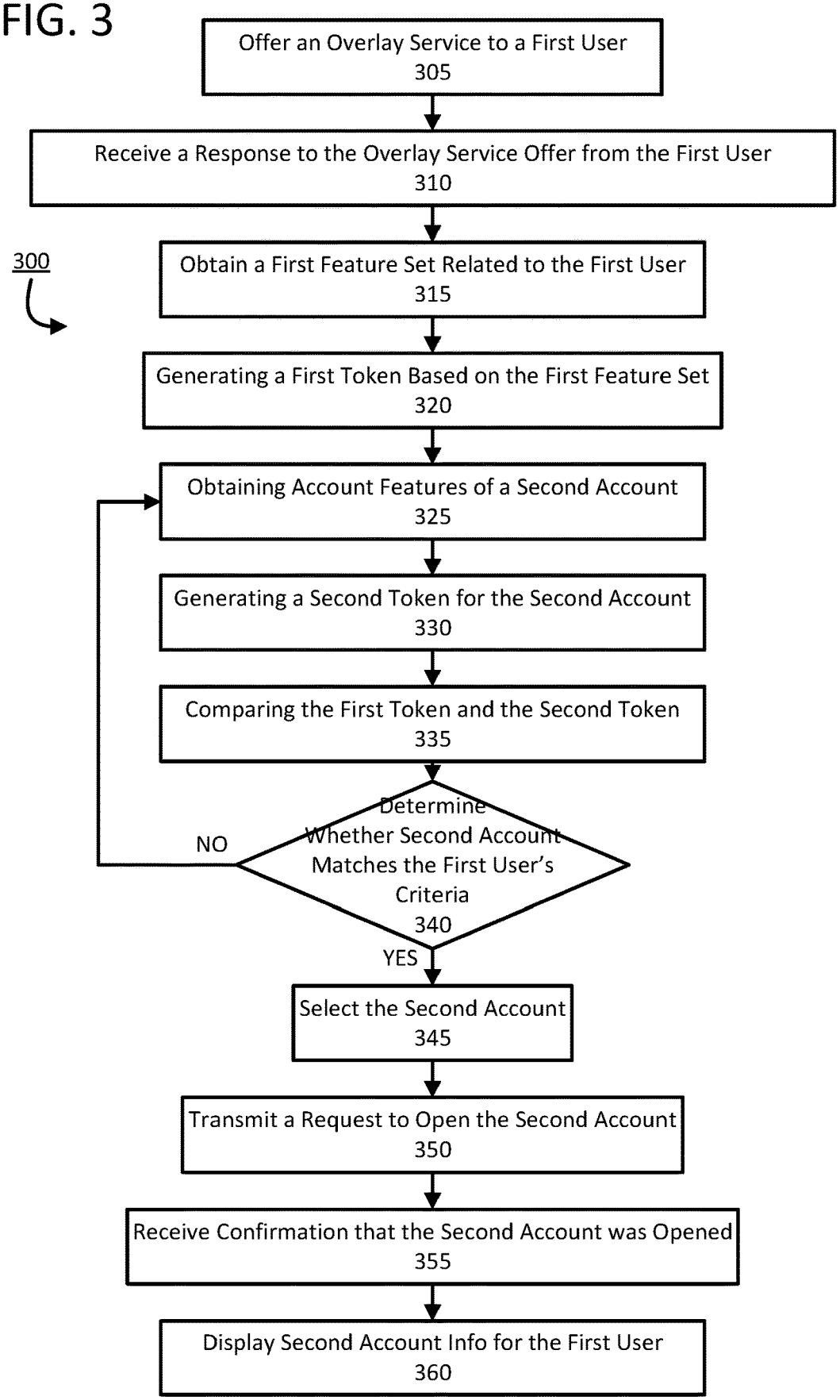
FIG. 3 shows a flow chart of a process for enrolling in an overlay service according to one or more aspects of the disclosure.

In order to increase return on investment, banking users may enroll in an overlay service to improve their returns. FIG. 3 shows a flow chart of a process 300 for enrolling in an overlay service according to one or more aspects of the disclosure. Some or all of the steps of process 300 may be performed using one or more computing devices.

Process 300 begins in block 305 with providing an offer of an overlay service to a first user. The offer may be provided by a first computing device, such as first server 130 discussed above. In this regard, the first computing device may transmit the offer to the first user via an email, text message, advertisement, or some other promotional material. Alternatively, the offer may be provided to the first user when the first user logins in to the banking application on their mobile device or home computing device. In some embodiments, the offer may be provided to the first user when the first user logs in to their bank account via a website. In block 310, the first computing device receives a response to the overlay service offer. The response may be a rejection of the overlay service offer, which would conclude process 300. In some instances, the response may be an acceptance of the overlay service offer, which indicates that the first user wishes to participate in the overlay service.

In response to receiving an acceptance of the overlay offer service, the first computing device may obtain a first feature set associated with the first user in block 315. In some embodiments, the first feature set may be obtained from a database associated with the first computing device, such as first database 140 discussed above. The first feature set may include information related to the first user, such as account information, account settings, and user-defined settings and preferences. Additionally, or alternatively, the first feature set may include location information obtained using one or more sensors on the first computing device. The location information may include places the first user frequently visits and routes that the first user frequently takes. In some embodiments, the first feature set may also include information related to the first user's spending habits and saving habits. For instance, first feature set may identify the first user's preference for dining out, buying groceries, or purchasing gas for his/her vehicle. In block 320, the first computing device may generate a first token based on the first feature set obtained from the database. As will be discussed in greater detail below, generating the first token may include analyzing the one or more features obtained from the database, assigning a score to each of the one or more features, and ranking each of the one or more features based on their assigned scores. In some embodiments, generating the first token may include scrubbing the first token of any user information or PII that may identify the first user to create an anonymized token. Since tokens may be accessible to external services, for example, through an API, anonymizing the token may prevent the disclosure of the first user's PII.

In block 325, the first computing device may obtain one or more account features of a second account from a third party. The third party may be a second bank. Alternatively, the third party may be a central overlay service that coordinates offers and promotions provided by one or more banks. The central overlay service may receive offers and promotions from one or more banks, aggregate the offers and promotions, and send them to other banks that participate in the overlay service. In some embodiments, the first computing device may obtain the one or more features of the second account by executing a scraping algorithm that extracts information from one or more websites. Continuing the banking example discussed above, the scraping algorithm may review one or more websites of a plurality of banks to obtain the one or more features associated with a second account.

In block 330, the first computing device may generate a second token for the second account. Similar to the first token, generating the second token may include analyzing the one or more features of the second account, assigning a score to each of the one or more features, and ranking each of the one or more features based on their assigned scores. As will be discussed in greater detail below, the one or more features may include the offers and incentives provided by the second account. These offers may include, for example, cash back bonuses, reward point opportunities, frequent flyer miles, high-interest savings, checking with interest, low or no fees, sign-on bonuses, and the like. The offers and incentives may be analyzed to determine how the offers and incentives compare to the offers and incentives provided by other institutions. This comparison may serve as the basis for the score assigned to the offers and incentives provided by the second account. For instance, high interest rate may receive a high score. In another instance, a rewards program, such as frequent flyer miles, that provides twice the rewards for spending (i.e. double-miles for each dollar spent) may earn a higher score than a rewards program that earns one reward for each dollar spent. The granularity of the analysis may go even further. For example, the analysis of the second account may examine the circumstances under which rewards can be earned. For example, double rewards for dining out or grocery shopping may be recognized and receive a corresponding score.

In block 335, the first computing device may compare the first token to the second token. In some embodiments, the first computing device may transmit the first token to the central overlay service to make the comparison. In other embodiments, the central overlay service may obtain the first token via an API to perform the comparison. In this regard, the comparison of the first token and the second token may be performed to determine whether the second token aligns with the features set forth in the first token. The comparison may be a side-by-side comparison to determine whether a threshold number of features overlap between the first token and the second token. Additionally, or alternatively, the comparison may be a score obtained by analyzing the first token and the second token. In some embodiments, the comparison may be performed using fuzzy logic or machine learning. In block 340, the first computing device may determine whether the second account matches the first user's criteria based on a result of the comparison. The determination may be based on a threshold. For example, if a predetermined number of features of the first token and the second token match, the threshold may be reached and the determination may indicate that the second account satisfies the first user's criteria. If the second account does not match the first user's criteria, process 300 may return to block 325 to analyze additional accounts to find a match for the first user.

When the second account does match the first user's criteria, the second account may be selected for the first user in block 345. In this regard, the steps performed by blocks 325 through 340 may be repeated to determine a plurality of second accounts. The plurality of second accounts may be presented to the first user, who may then select one of the plurality of second accounts in block 345. Alternatively, the first computing device may select the second account from a plurality of second accounts on behalf of the first user.

In block 350, the first computing device may transmit a request to open the second account. The request may be transmitted directly to a second institution that manages the second account. Alternatively, the request may be routed to the second institution through a third party, such as a central overlay service. The request may contain information to open the account without disclosing user information or PII of the first user to the second institution. For instance, the request may replace information identifying the first user with placeholder information. In this regard, information related to a first institution associated with the first computing device may be used instead of the first user's information. For example, the name of the first institution associated with the first computing device may be used in lieu of the first user's name and the address of the first institution may be used instead of the first user's address. Alternatively, first computing device may generate a first unique identifier for the first user's name for the second account. For instance, the first unique identifier may be a pseudorandom string generated by a pseudorandom generator. Alternatively, the first unique identifier may be generated by passing information about the first user through a hash function. In this regard, the first user's name may be passed through a hash function and the resultant hash may be used. Alternatively, the first user's name and a seed value, such as the first user's date of birth, the first user's social security number, or some other random value, may be hashed to generate the first unique identifier. Similarly, the request may use a second unique identifier in lieu of the first user's social security number. Like the first unique identifier, the second unique identifier may be a pseudorandom string of characters or the product of a hash function. In some embodiments, the request may also include an initial deposit, a username, and a password for the account. As will be discussed in greater detail below, the username and password may be pseudorandom strings.

In block 355, the first computing device may receive a confirmation from the second institution that the second account was opened. The confirmation may include the account number, routing number, and other information related to the second account. In block 360, the second account information may be displayed to the first user. In preferred embodiments, the second account information may be displayed to the first user via an interface. The interface may provide the first user with access to account information for accounts maintained by the first institution, as well as account information for accounts maintained at third-party institutions. Examples of the interface are discussed in greater detail below with respect to FIG. 8D.

Figure 4:
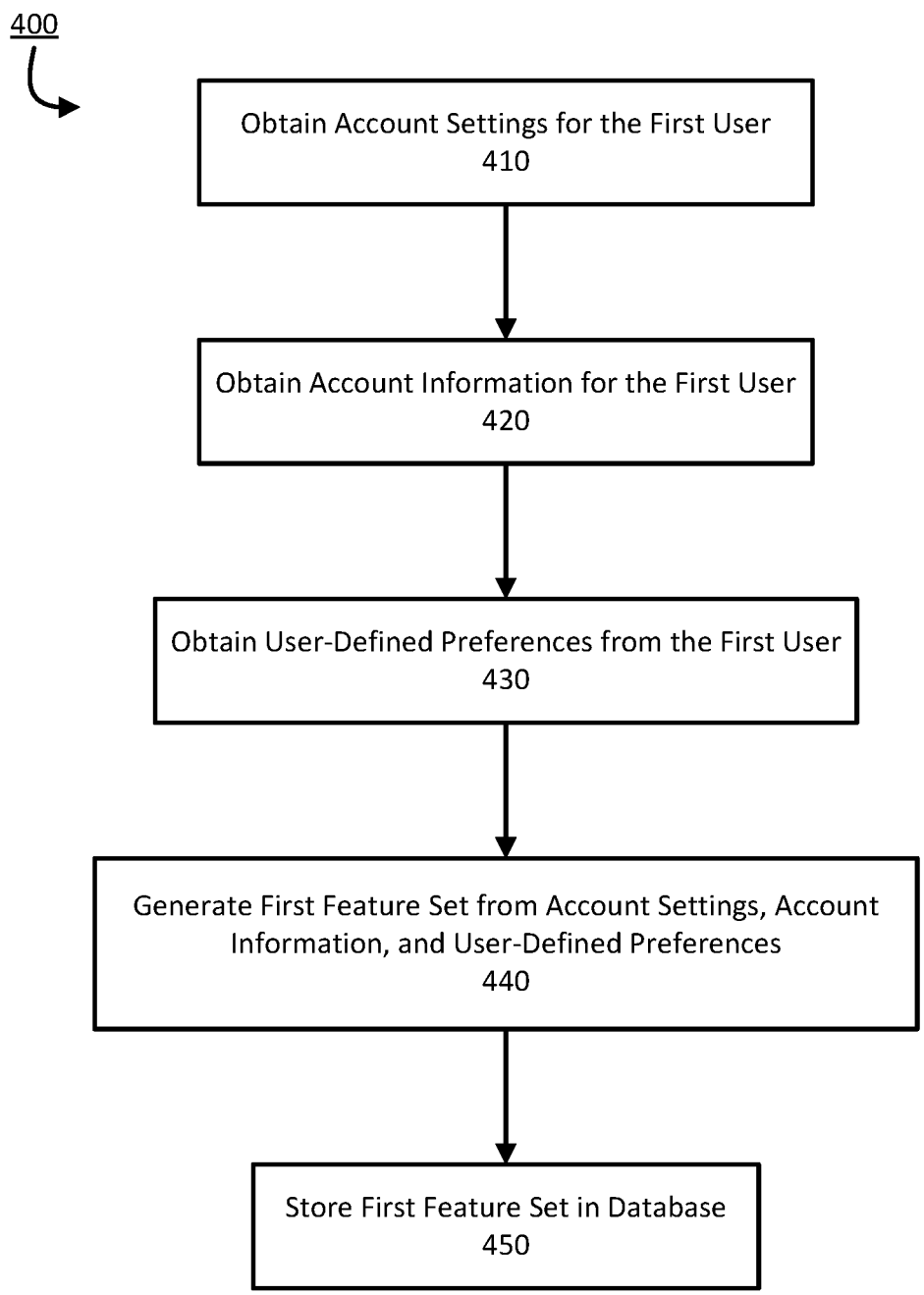
FIG. 4 shows a flow chart of a process for determining a first feature set that reflects a first user profile according to one or more aspects of the disclosure.

As noted above, the process of determining the appropriate account begins with understanding the first user. This understanding comprises understanding the first user's investment goals and risk tolerance, as well as the first user's spending habits, account settings, and preferences. FIG. 4 shows a flow chart of a process 400 for determining a first feature set that reflects a first user profile according to one or more aspects of the disclosure. Some, or all, of the steps of process 400 may be performed using one or more computing devices as described herein.

After receiving an input from the first user indicating his/her participation in the overlay service, the first computing device may obtain account settings in block 410. As noted above, the account settings may be obtained from a database, such as first database 140. Account settings may include, but is not limited to, a first name of the first user, a last name of the first user, the first user's social security number, contact information, background check, bill pay information, spending habits, direct deposit information, overdraft protection, and the like.

In block 420, the first computing device may obtain account information. Much like the account settings, the account information may be retrieved from a database, such as first database 140. The account information may include a username and password for the first user, personal information of the first user, and one or more features associated with a first account that belongs to the first user. The one or more features associated with the first account may include the interest rate associated with the first account and/or any rewards and/or incentives associated with the first account, such as rewards points, cash back bonuses, frequent flyer miles, etc.

In block 430, the first computing device may obtain one or more user-defined preferences from the first user. The one or more user-defined preferences may be obtained via a user interface presented to the first user. In this regard, the user interface may present the first user with a series of questions to determine the first user's investment goals, strategy, and risk tolerance. Additionally, or alternatively, the user may be presented with rewards and/or incentives that the first user is interested in receiving. This may be presented as a series of check boxes that allow the first user to check off rewards and/or incentives he/she may be interested in. Alternatively, or additionally, the first user may be asked to score and/or rank the rewards and/or incentives he/she is most interested in.

In block 440, the first computing device may generate a first feature set for the first user based on the account settings, the account information, and the user-defined preferences. In some embodiments, the account settings, the account information, and the user-defined preferences may be analyzed to recognize one or more features that may be applicable to the first user. For instance, if spending habits reflect that the first user dines out frequently, the first computing device may determine that receiving reward points for dining out may be a feature applicable to the first user. Similarly, if the account settings show payments made to airlines and hotels, the first computing device may determine that receiving frequent flyer miles may be a feature applicable to the first user. In another example, the first computing device may recognize that the first user maintains a high balance in his/her savings account. Accordingly, the first computing device may recognize that a high interest rate may be a feature applicable to the first user. Based on these examples, the first computing device may generate a first feature set for the first user in accordance with information gleaned from his/her the account settings, the account information, and/or the user-defined preferences. In block 450, the first computing device may store the generated first feature set in a database, such as first database 140.

Figure 5:
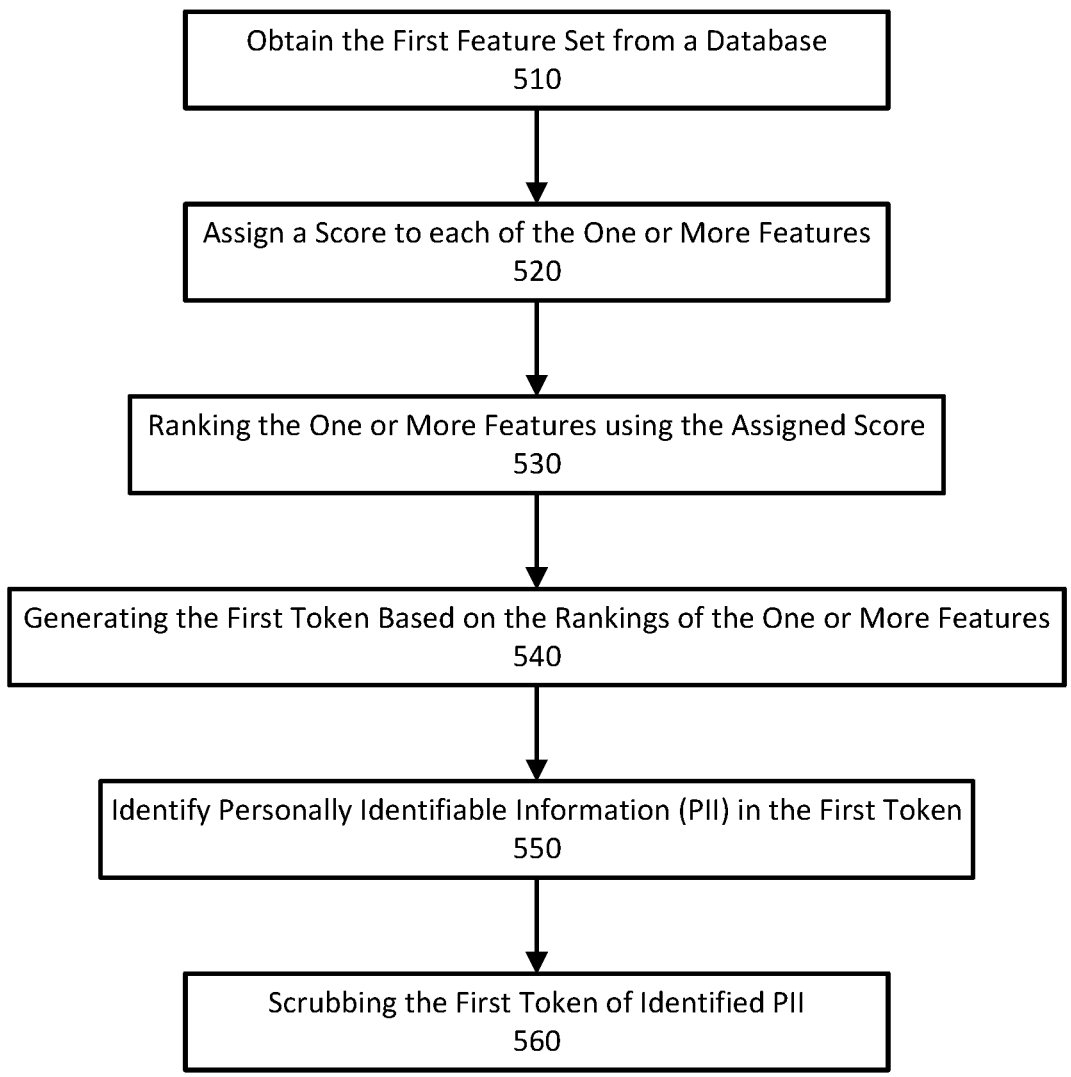
FIG. 5 shows a flow chart of a process for generating a first token to represent a prioritized feature set for a first user according to one or more aspects of the disclosure.

After obtaining a better understanding of the first user, the first computing system may prioritize the features in the first feature set to determine appropriate search criteria for locating a second account for the first user. FIG. 5 shows a flow chart of a process 500 for generating a first token to represent a prioritized feature set for a first user according to one or more aspects of the disclosure. Some or all of the steps of process 500 may be performed using one or more computing devices as described herein.

To generate the first token, process 500 begins by obtaining the first feature set from the database in block 510. In this regard, first computing device may transmit a request for the first feature set to the database. In response to the request, the first computing device may receive the first feature set from the database. In block 520, the first computing device may analyze the one or more features contained in the first feature set and assign a score to each of the one or more features in the first feature set. This analysis may take into account the first user's account settings, account information, and user-defined settings to determine the score assigned to each of the one or more features. In some embodiments, one category may be weighted more heavily than other categories. For example, user-defined settings may be weighted more than account settings or account information. Accordingly, any features originating from user-defined settings may receive a higher score that features arising out of account settings or account information. In this regard, the assigned score may represent how important the feature is to the first user. That is, the higher the score the more likely that the first user would like to see that feature in the second account.

In block 530, the one or more features may be ranked based on the score assigned to each of the one or more features. In this regard, the one or more features may be ranked from highest score to lowest score. This may help the first computing device prioritize the features for the first user. That is, the scoring may be indicative of which features are most important to the first user. In block 540, the first computing device may generate the first token based on the rankings of the one or more features. In some embodiments, the first computing device may generate an extensible markup language (XML) document, or a document of some comparable format, to compare to other tokens. In block 550, the first token may be reviewed to identify user information or PII. In some embodiments, a lexical analysis may be performed on the first token to locate user information and/or PII. Additionally, or alternatively, machine learning or fuzzy logic may be used to review the first token to locate user information and/or PII. In block 560, the first token may be scrubbed of user information and/or PII. In some instances, user information and/or PII may be deleted, or otherwise removed, from the first token. Alternatively, user information and/or PII may be obfuscated in the first token. Obfuscating the user information and/or PII may include encrypting the user information and/or PII in the first token. Alternatively, obfuscating the user information and/or PII may include replacing the user information and/or PII with unique identifiers, such as pseudorandom strings of data or hash values of the user information and/or PII. As noted above, the first token may be accessible to third-parties, for example, via an API. Scrubbing the first token of user information and/or PII helps anonymize the toke to further secure the first user's data from being disclosed to unauthorized third parties. Thus, in order to better protect the first user's information and PII and comply with privacy regulations, user information and the PII may be scrubbed from the first token to reduce the likelihood of the user information and/or PII failing into the hands of an unauthorized third party.

Figure 6:
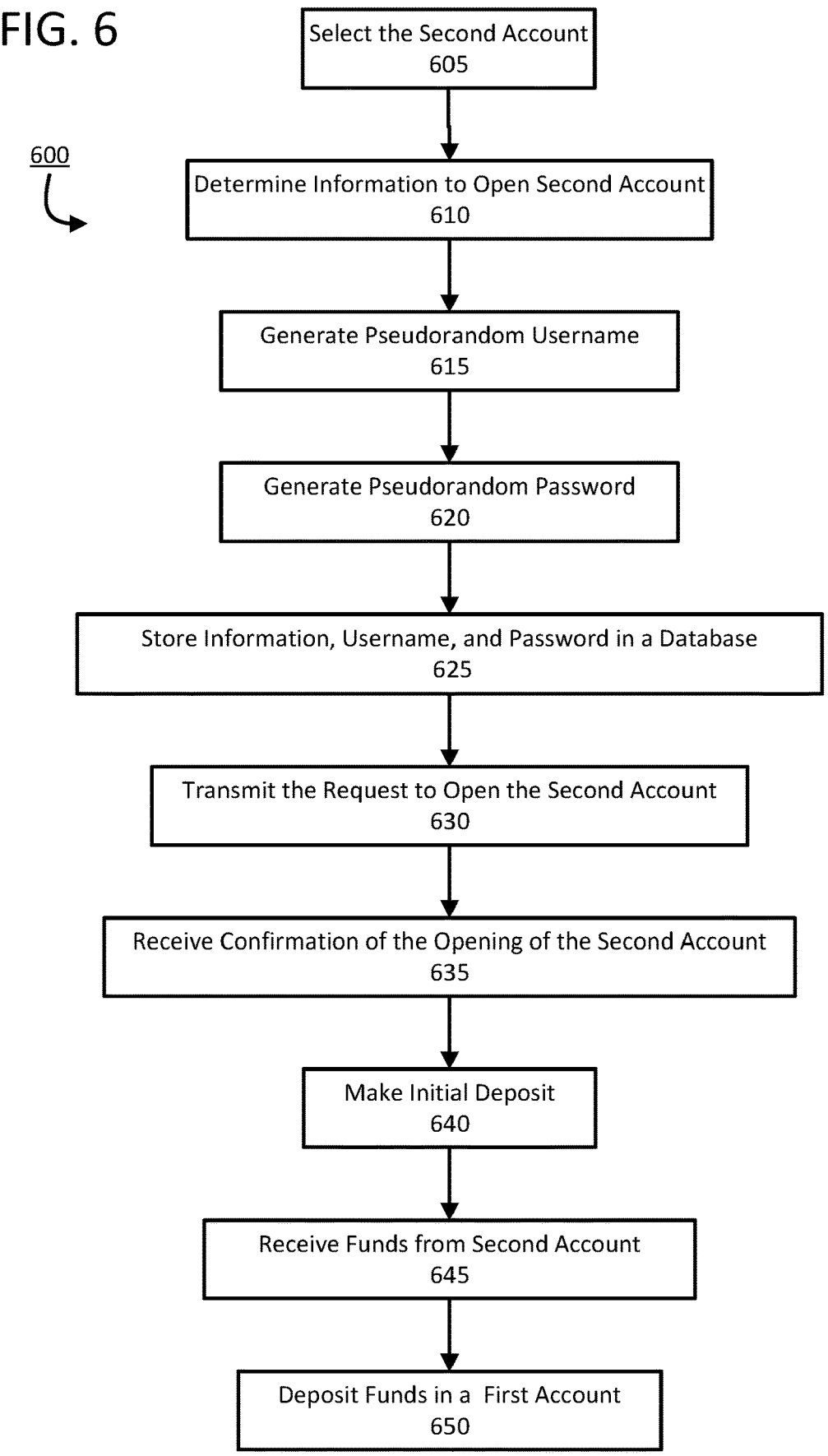
FIG. 6 shows a flow chart of a process 600 for securely opening a second account as part of an overlay service according to one or more aspects of the disclosure.

The anonymized first token may be used to locate a second account for the first user that matches his/her criteria for investment purposes and/or rewards and incentive purposes. Once the second account is determined, the second account may need to be opened in a way that prevents disclosure of the first user's identity. FIG. 6 shows a flow chart of a process 600 for securely opening a second account as part of an overlay service according to one or more aspects of the disclosure. Some or all of the steps of process 600 may be performed using one or more computing devices as described herein.

Process 600 begins in block 605, with the second account may be selected. As discussed above, selection of the second account may be done by the first user or the first computing device may automatically select the second account on behalf of the first user. In block 610, the first computing device may determine the information to open the second account. The information may include a first name, a last name, address information, a phone number, a social security number (or other comparable government identification number), a username, a password, and/or an initial deposit. As discussed above, first computing device may substitute unique identifiers for some of the information required to open an account. Alternatively, or additionally, the first computing device may use information (i.e. phone number, address) of the first institution on behalf of the first user to open the second account. In block 615, a pseudorandom username may be generated. The pseudorandom username may be a first random string generated by a pseudorandom generator. Alternatively, the pseudorandom username may be the result of hashing the first user's name and a seed value. In block 620, a pseudorandom password may be generated. The pseudorandom password may be a second string random string generated by the pseudorandom generator.

In block 625, the information to open the second account, the pseudorandom username, and the pseudorandom password may be stored in a database. The database may be first database 140, discussed above, or an authentication database used by first server 130 to manage user credentials. In this regard, the information to open the second account, the pseudorandom username, and the pseudorandom password may be mapped to the first user's information stored in the authentication database. In some embodiments, overlay management software 134 may have a memory for managing user credentials and mapping the account information and credentials to the appropriate user.

In block 630, the request to open the second account may be transmitted to the second institution. In some embodiments, the request may be transmitted by overlay management software 134. As noted above, the request may include the information to open the second account, the pseudorandom username, and the pseudorandom password. In preferred embodiments, the request may be encrypted before being transmitted to the second account. In this regard, the request to open the second account may be encrypted with a public key of the second institution. Alternatively, the request to open the second account may be encrypted with a symmetric key shared by the first institution and the second institution. In some embodiments, the request to open the second account may be transmitted over a secure channel, such as one secured by Secure Sockets Layer (SSL), Transport Layer Security (TLS), or the like.

In block 635, the first computing device may receive confirmation of the opening of the second account. As discussed above, the confirmation may include the account number, routing number, and other information related to the second account. Additionally, the confirmation may be encrypted or received over the secure channel. Accordingly, the first computing device may decrypt the confirmation to obtain the information contained therein. In block 640, the first computing device may make an initial deposit in the second account. The initial deposit may be a wire transfer, a bank transfer, a credit transfer, a SWIFT transfer, or the like. The initial deposit may be submitted concurrently with the request to open the second account. Alternatively, the initial deposit may be made in response to receiving the confirmation that contains the account number and the routing number. Additionally, or alternatively, the initial deposit may be secured in a similar fashion as the request to open the second account.

In block 645, the first computing device may receive funds for opening the second account. As discussed above, the funds may be a reward, bonus, or incentive for opening the second account. Alternatively, or additionally, the second account may be an investment account and the funds may be dividends received from the second account. The funds may include information, such as the unique identifier used as the name, the pseudorandom username, the account number, or some other identifying information that indicates the origination of the funds. In block 650, the funds may be deposited in a first account of the first user managed by the first institution. In order to deposit the received funds in the correct account, the first computing device may use the identifying information to look-up the corresponding account on the first computing device. This look-up may include querying the database with the identifying information received with the funds to identify the appropriate account on the first computing device. Accordingly, the received funds may be deposited in an account of the first user.

Figure 7:
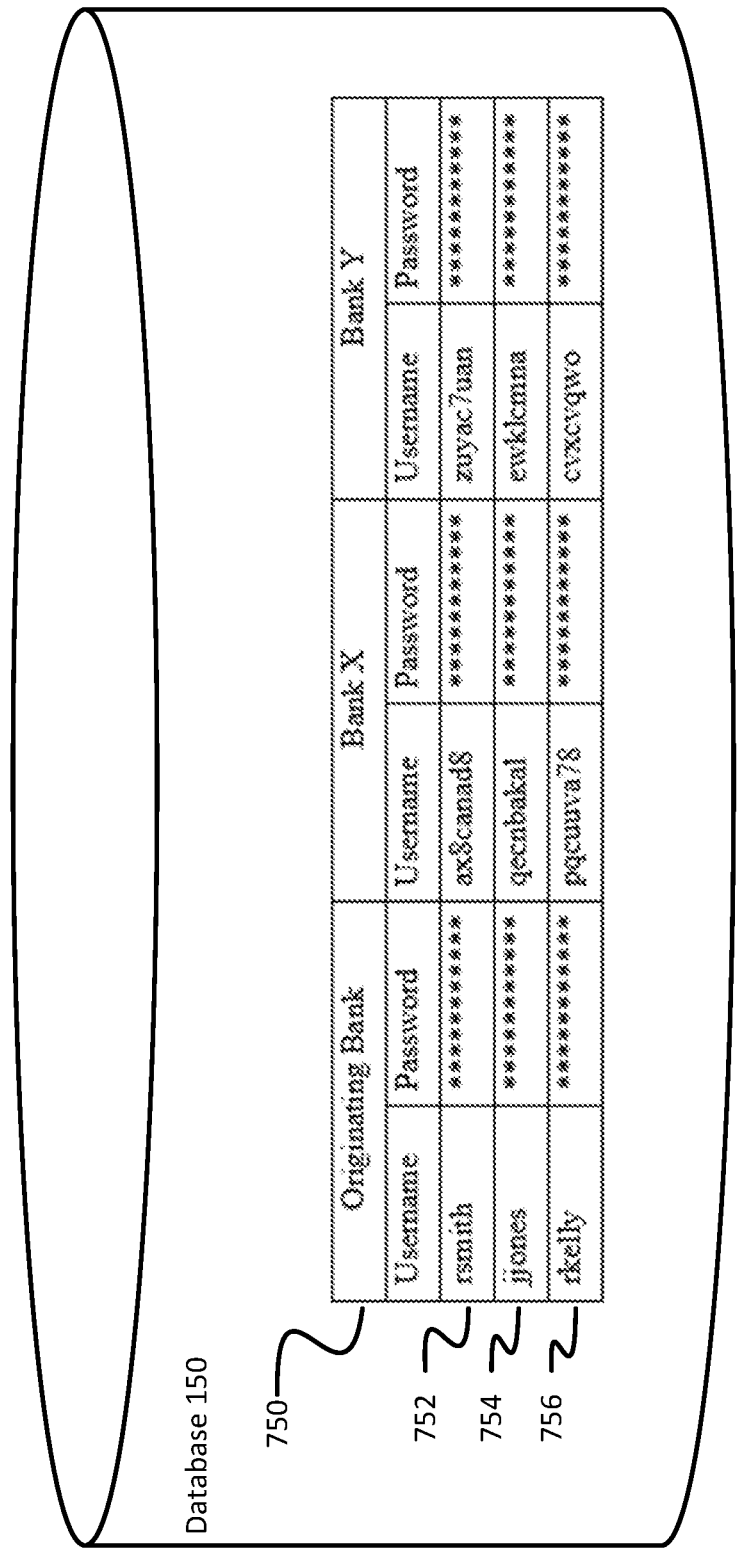
FIG. 7 shows a database for storing and mapping user information for overlay management purposes according to one or more aspects of the disclosure.

Turning to FIG. 7, an example of database 150 is shown for storing and mapping user information for overlay management purposes according to one or more aspects of the disclosure.

Database 150 may include a first table 750 that stores user information on behalf of a banking application, such as banking application 132. First table may also store user information on behalf of an overlay service, such as overlay management software 134. First table 750 may include a first entry 752, a second entry 754, and a third entry 756. These entries are merely illustrative, and it will be appreciated that first table 750 may include more entries.

First entry 752 may be associated with a first user (i.e. "rsmith") and include a first username and a first password for an originating bank. First entry 752 may also include a second username and a second password for Bank X and a third username and a third password for Bank Y. In this regard, the first user may have accounts with Bank X and Bank Y through the overlay service. Accordingly, the Originating Bank may use the information stored in table 750 to retrieve account information to be displayed to the first user via an interface. Similarly, first entry 752 may be used to route funds received from Bank X and/or Bank Y to the appropriate account of the first user. While table 750 shows usernames and passwords for the banks where the first user has accounts, it will be appreciated that table 750 may include additional information, such as account numbers, routing numbers, social security numbers, unique identifiers, etc.

Second entry 754 and third entry 756 may be associated with a second user (i.e. "jjones") and a third user (i.e. "rkelly"), respectively. Like first entry 752, second entry 754 and third entry 756 may be used to map account information from other banks (i.e., Bank X, Bank Y) to the account information of the user at the originating bank. Using a table, like table 750, overlay management software 134 may be able to deposit funds, rewards, and incentives in the appropriate account.

Figure 8A:
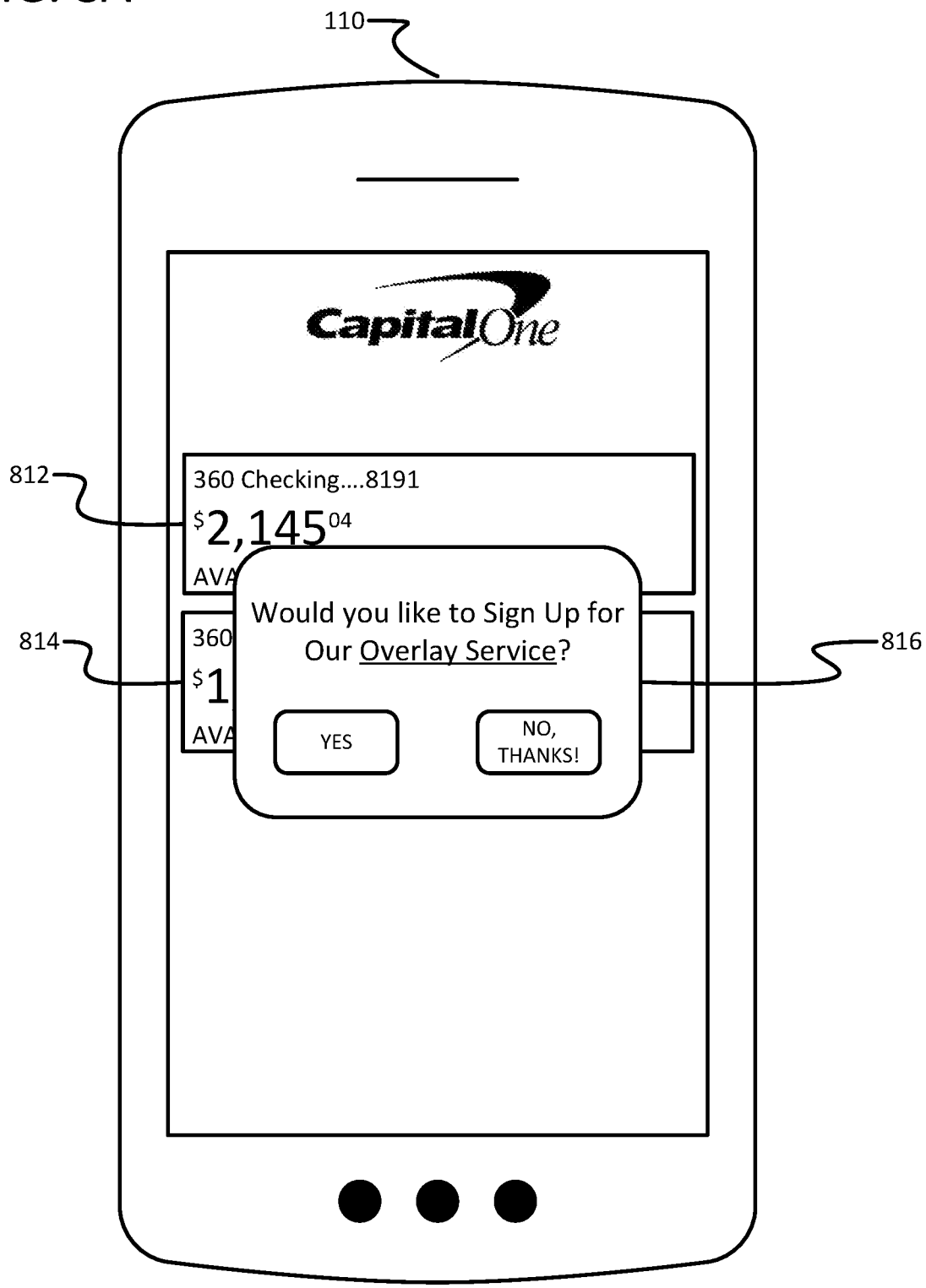
FIGS. 8A-8D show an example of mobile banking with an overlay service according to one or more aspects of the disclosure.

FIGS. 8A-8D shows an example of mobile banking with an overlay service according to one or more aspects of the disclosure. In this regard, FIG. 8A illustrates an example of mobile banking on first user device 110, after a user has logged in. The mobile banking application may show first checking account 812 and first savings account 814. Upon login, the mobile banking application may provide notification 816 inquiring as to whether the user would like to enroll in an overlay service. Notification 816 may provide the user with options to accept, deny, or postpone the decision making process. In some embodiments, notification 816 may provide the user with an option to learn more about overlay services. The option may include a hyperlink that, when selected, brings up a browser window explaining overlay services. When the first user rejects the overlay service, the process concludes and the user is able to perform his/her mobile banking functions. However, when the first user accepts the overlay service provided in notification 816, the first user may be prompted to provide more information.

Figure 8B:
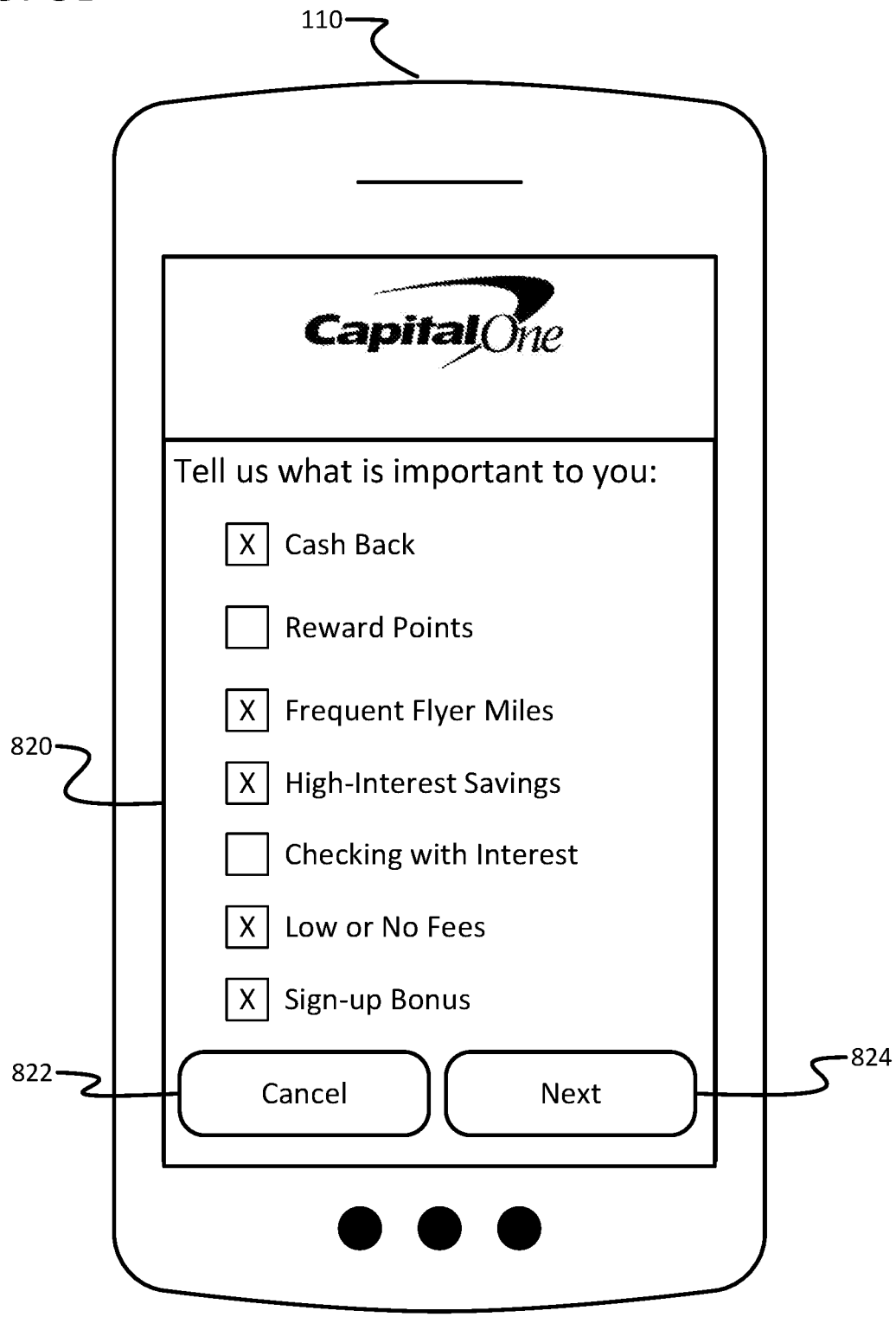

FIG. 8B show an example of an interface 820 where the first use may be asked to provide additional information. Interface 820 may prompt the user to indicate what incentives are important to him/her. Interface 820 illustrates a plurality of incentives and prompts the user to check those that are important. However, it will be appreciated that other interfaces may be shown, including one where a user may be prompted to rank the incentives. If the user wishes to cancel his/her enrollment, the user may select cancel button 822 at any time. However, when the user completes selection of the incentives that are important to them, the user may select the next button 824. Selecting next button 824 may prompt overlay management software to determine one or more second accounts for the user to select, as discussed above.

Figure 8C:
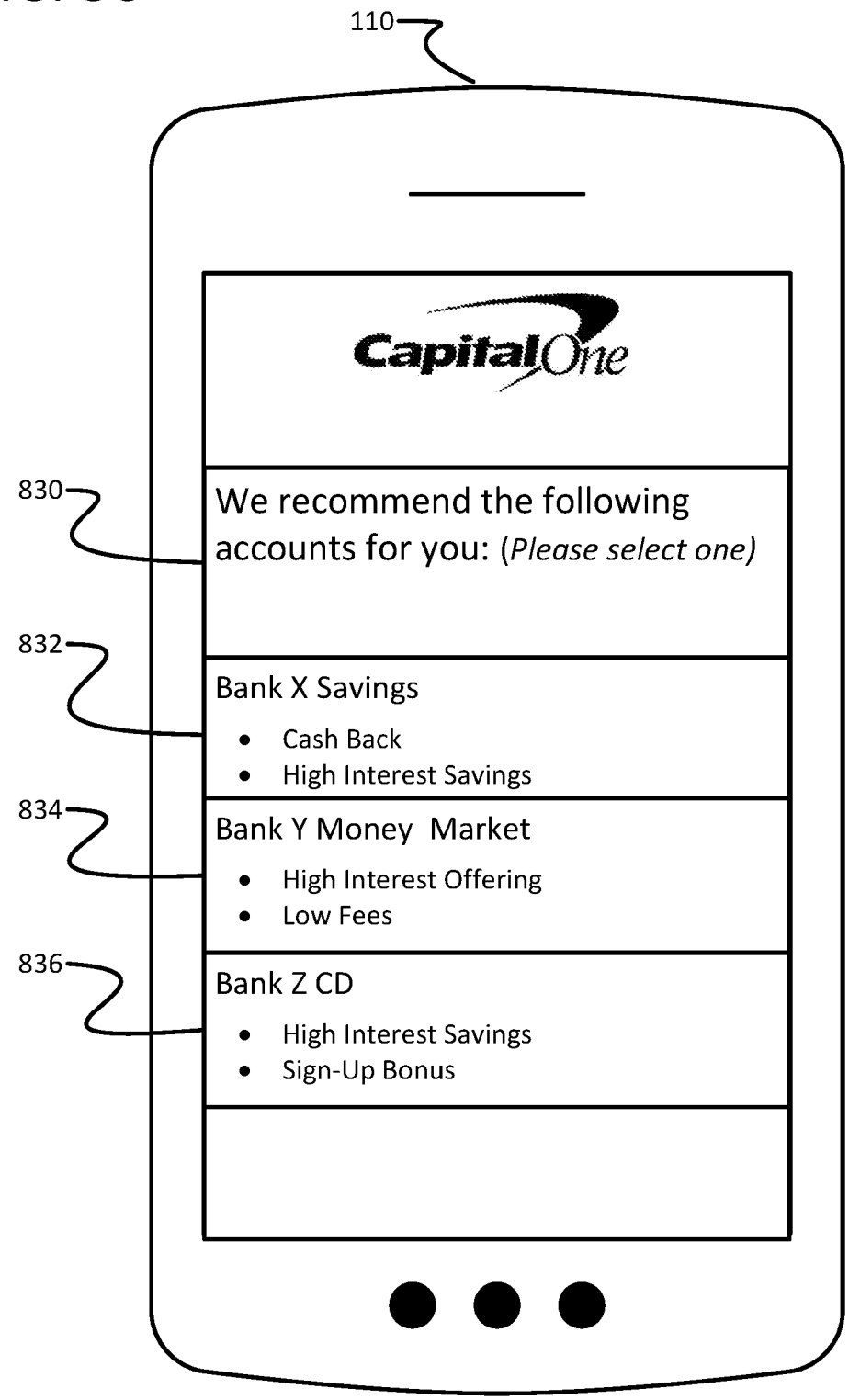

FIG. 8C shows an example of an interface 830 that may provide a plurality of second accounts for the user to choose. As shown interface 830 illustrates a first second account 832, a second second account 834, and a third second account 836. It will be appreciated that interface 830 may show more, or fewer, second accounts based on the first user's criteria. Interface 830 may allow the user to select the second account. Additionally, first second account 832, second second account 834, and third second account 836 may provide information about the features associated with the account and why it was selected as an option of the user. For example, first second account 832 may indicate that the account includes cash back options and high interest savings. Similarly, second second account 834 may indicate that it has a high interest rate and low fees. Finally, third second account 836 may offer high interest savings and a sign-up bonus. Additionally, or alternatively, each of the plurality of second accounts may provide a link (not shown) that allows the user to learn more about each of the offerings.

Figure 8D:
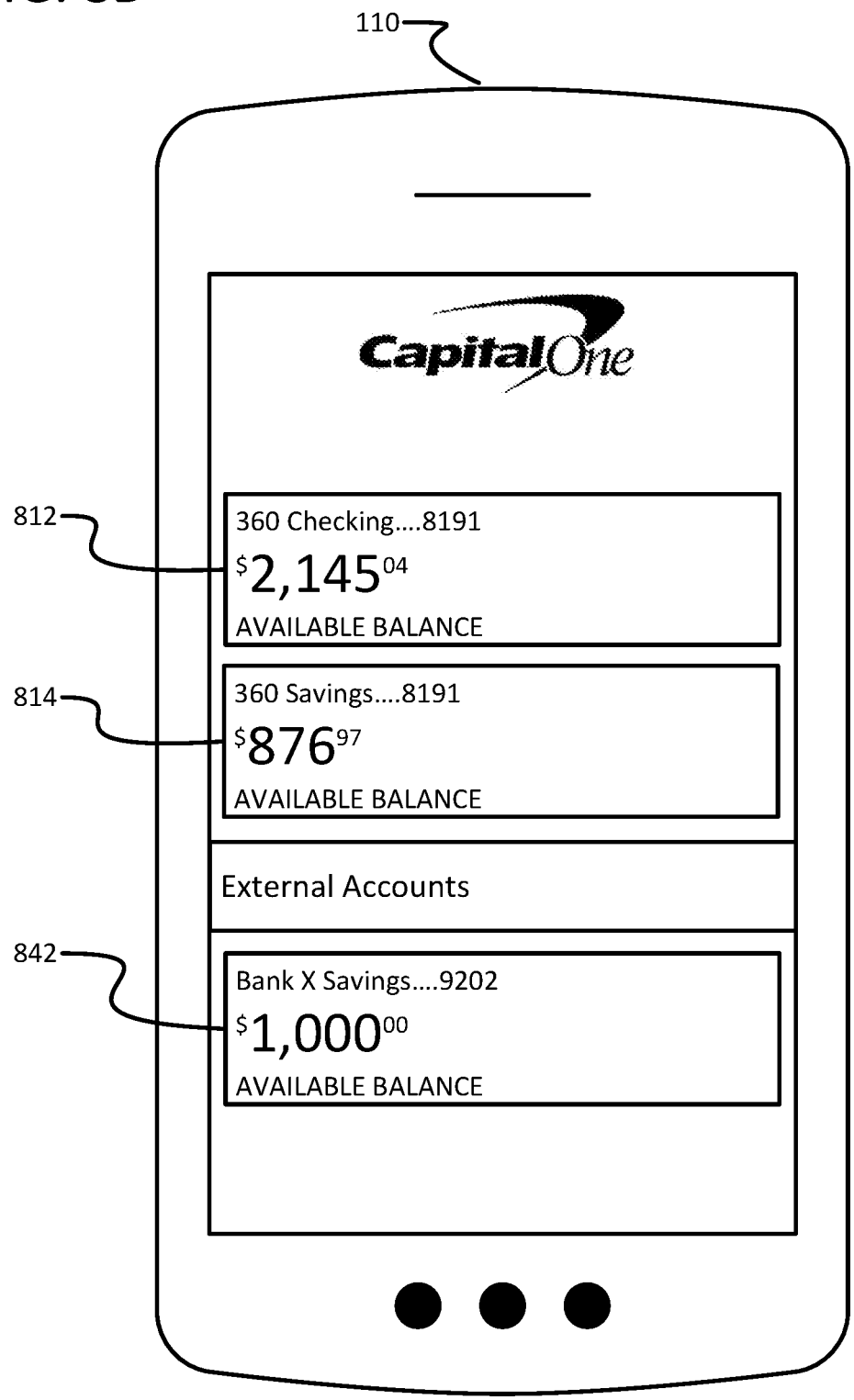

Once a user selects one of the plurality of second accounts, overlay management software 134 may enroll the user in the account according to the algorithms discussed above. After enrollment is complete, the user may be able to see the account via the mobile banking application his/her mobile device. FIG. 8D illustrates an example of the mobile banking application. The mobile banking application may show first checking account 812 and first savings account 814 as shown above in FIG. 8A, as well as second account 842 hosted by Bank X. According to some embodiments, the user may be able to manage the money in second account 842 through the mobile banking application. This may include transferring money and scheduling bill pay.

Figure 9:
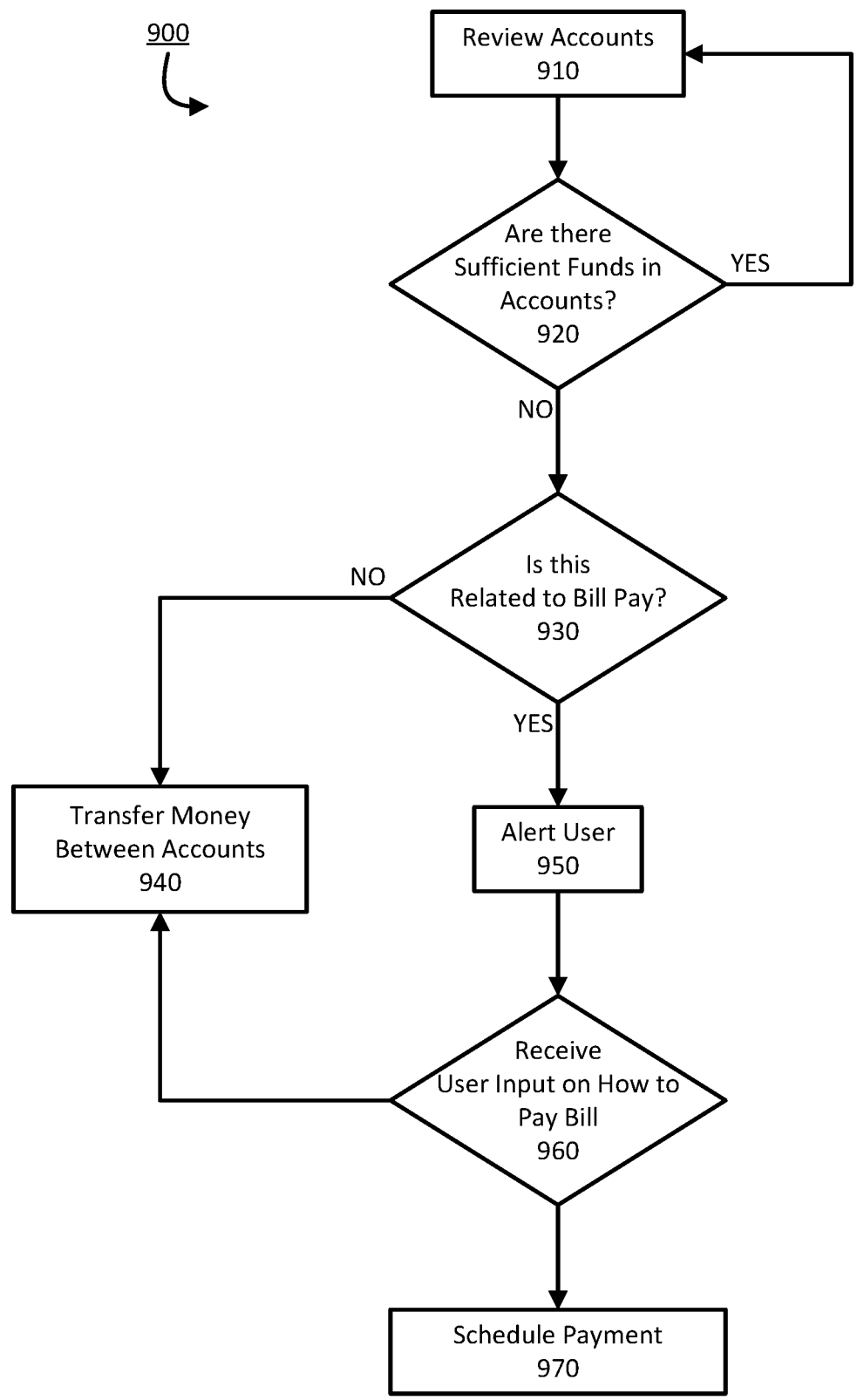
FIG. 9 shows a flow chart of a process for managing money between accounts according to one or more aspects of the disclosure.

Turning to FIG. 9, a flow chart of a process 900 for managing money between accounts at different banks according to one or more aspects of the disclosure. Some or all of the steps of process 900 may be performed using one or more computing devices as described herein. In some embodiments, some, or all, of the steps of process 900 may be performed by overlay management software 134.

In block 910, the user's accounts may be reviewed. In some embodiments, the accounts may be reviewed to determine the balances in each account. In block 920, a determination may be made as to whether there are sufficient funds in each of the accounts. This may be performed to ensure that the accounts comply with minimum balance requirements, as well as other requirements, to ensure that the accounts do not incur any fees. Additionally, the determination may be made to ensure that the account complies with the requirements to remain eligible for incentives. As will be discussed in greater detail, the determination may be made to ensure there is sufficient funds to cover schedule bill payments. When there are sufficient funds in the accounts, process 900 returns to block 910 to repeat the inquiry until a time there are insufficient funds in the user accounts.

When insufficient funds are present in the user's accounts, a determination may be made as to whether the insufficient funds are related to bill pay in block 930. That is, a determination may be made as to whether the user has sufficient funds to cover his/her bills. If the determination indicates that the shortfall does not pertain to bill pay, process 900 proceeds to block 940 where money may be transferred amongst the accounts to bring them back into compliance. When the determination indicates that the shortfall is related to bill pay, process 900 proceeds to block 950, where the user may be alerted. The alert may be via an email, text, or a push notification. In response to the alert, the user may log in to his/her bank to provide input on how to pay the bill in block 960. In this regard, the user may transfer money between accounts, like in block 940. Alternatively, the user may schedule payment from accounts hosted at different banks in block 970. As noted above in FIG. 8D, the interface may provide the user with the ability to schedule a first amount of the bill to be paid from a first account hosted at a first institution and a second amount of the bill to be paid from a second account hosted at a second institution. For example, the user may pay a first portion of the bill from first checking account 812 and a second portion of the bill from second account 842. This may allow both accounts to remain compliant with the requirements of each account, while providing the user with the ability to pay his/her bills.

Protecting user information by redacting personally identifiable information (PII) from information that may be exposed to third parties and using unique identifiers to open accounts on behalf of the user protects users' identities and privacy as their assets are transferred between various institutions. Further, limiting the amount of PII exposed to third parties reduces the likelihood that user information ends up with malicious users for nefarious purposes.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    obtaining, by a first computing device from a first database, a first feature set related to a first account of a first user, wherein the first feature set comprises a ranking of features based on account information, account settings, and user-defined settings;
    generating, by the first computing device, a first token for the first user based on the first feature set, wherein personally identifiable information is removed from the first token;
    comparing, by the first computing device, the first token to a second token to determine whether account features of a second account match the first feature set;
    selecting, by the first computing device, the second account for the first user as part of an overlay service based on a determination that the account features of the second account match the first feature set; and
    transmitting, by the first computing device to a third party over a secure channel, a request to open the second account, wherein the request comprises personally identifiable information, account information, and account settings.

2. The computer-implemented method of claim 1, further comprising:
    receiving, by the first computing device from the third party, confirmation that the second account was opened on behalf of the first user; and
    causing, by the first computing device, account information from the second account to be displayed via an interface provided to the first user.

3. The computer-implemented method of claim 1, wherein account information is obtained from a first server and comprises at least one of a username, password, personal information, and one or more features associated with the first account.

4. The computer-implemented method of claim 1, wherein account settings are obtained from a first server and comprises at least one of a name, a social security number, contact information, a background check, bill pay information, direct deposit information, and overdraft protection.

5. The computer-implemented method of claim 1, wherein user-defined settings are obtained via an interface and comprises at least one of reward programs, incentive programs, and preferred interest rates.

6. The computer-implemented method of claim 1, wherein user-defined settings are obtained using one or more sensors and comprise location information of the first user.

7. The computer-implemented method of claim 1, wherein ranking the features comprises:
analyzing one or more features associated with the first account to determine which of the one or more features the first user uses and how frequently each of the one or more features is used, and
assigning a score to each of the one or more features based on which of the one or more features the first user uses and how frequently each of the one or more features is used; and
ranking each of the one or more features based on their assigned scores.

8. The computer-implemented method of claim 1, wherein ranking the features comprises:
receiving, from the first user, an indication of one or more features that are important to the first user;
comparing the indication of the one or more features received from the first user to a record of the one or more features the first user actually uses; and
assigning a score to each of the one or more features based on the indication received from the first user and the record of the one or more features the user actually uses; and
ranking each of the one or more features based on their assigned scores.

9. The computer-implemented method of claim 1, wherein removing personally identifiable information from the first token comprises:
analyzing information contained in the first token to identify personally identifiable information; and
obfuscating the identified personally identifiable information contained in the first token.

10. The computer-implemented method of claim 1, wherein removing personally identifiable information from the first token comprises:
analyzing information contained in the first token to identify personally identifiable information; and
deleting the identified personally identifiable information contained in the first token.

11. The computer-implemented method of claim 1, wherein the account features of the second account are obtained from the third party via a scraping algorithm.

12. The computer-implemented method of claim 1, wherein the account features of the second account are received from the third party as part of the overlay service.

13. The computer-implemented method of claim 1, comprising:
generating, by the first computing device, a pseudorandom username and a pseudorandom password based on the selecting the second account for the first user; and
transmitting, by the first computing device to the third party, the pseudorandom username and the pseudorandom password with the request to open the second account.

14. The computer-implemented method of claim 1, comprising:
arranging a first partial payment from the first account; and
arranging a second partial payment from the second account.

15. A computing device comprising:
one or more processors; and
memory storing instructions that, when executed by the one or more processors, cause the computing device to:
obtain a first feature set related to a first account of a first user, wherein the first feature set comprises a ranking of features based on account information, account settings, and user-defined settings;
generate a first token for the first user based on the first feature set, wherein personally identifiable information is removed from the first token;
compare the first token to a second token to determine whether account features of a second account match the first feature set;
select the second account for the first user as part of an overlay service based on a determination that the account features of the second account match the first feature set; and
transmit, via a secure channel, a request to open the second account, wherein the request comprises personally identifiable information, account information, and account settings.

16. The computing device of claim 15, wherein the instructions cause the computing device to:
receive confirmation that the second account was opened on behalf of the first user; and
cause account information from the second account to be displayed via an interface provided to the first user.

17. The computing device of claim 15, wherein the instructions cause the one or more processors to:
arrange a first partial payment from the first account; and
arrange a second partial payment from the second account.

18. One or more non-transitory media storing instructions that, when executed by one or more processors, cause the one or more processors to perform steps comprising:
obtaining, from a first database, a first feature set related to a first account of a first user, wherein the first feature set comprises a ranking of features based on account information, account settings, and user-defined settings;
generating a first token for the first user based on the first feature set, wherein personally identifiable information is removed from the first token;
comparing the first token to a second token to determine whether account features of a second account match the first feature set;
selecting the second account for the first user as part of an overlay service based on a determination that the account features of the second account match the first feature set; and
transmitting, to a third party over a secure channel, a request to open the second account, wherein the request comprises personally identifiable information, account information, and account settings.

19. The one or more non-transitory media of claim 18, wherein the instructions cause the one or more processors to perform steps comprising:
receiving, from the third party, confirmation that the second account was opened on behalf of the first user; and
causing account information from the second account to be displayed via an interface provided to the first user.

20. The one or more non-transitory media of claim 18, wherein the instructions cause the one or more processors to perform steps comprising:
  arranging a first partial payment from the first account; and
  arranging a second partial payment from the second account.

* * * * *